United States Patent
Harding et al.

(10) Patent No.: US 7,858,004 B2
(45) Date of Patent: Dec. 28, 2010

(54) METHOD AND APPARATUS FOR THE PRODUCTION OF HIGH TENACITY POLYOLEFIN SHEET

(75) Inventors: Kenneth C. Harding, Midlothian, VA (US); Gene C. Weedon, Richmond, VA (US)

(73) Assignee: BAE Systems Tensylon H.P.M., Inc., Monroe, NC (US)

( * ) Notice: Subject to any disclaimer, the term of this patent is extended or adjusted under 35 U.S.C. 154(b) by 221 days.

(21) Appl. No.: 12/287,799

(22) Filed: Oct. 14, 2008

(65) Prior Publication Data

US 2009/0243138 A1    Oct. 1, 2009

Related U.S. Application Data

(63) Continuation-in-part of application No. 12/080,197, filed on Apr. 1, 2008.

(51) Int. Cl.
*B29C 55/02* (2006.01)
(52) U.S. Cl. ...................... 264/119; 264/120; 264/288.4
(58) Field of Classification Search ...................... None
See application file for complete search history.

(56) References Cited

U.S. PATENT DOCUMENTS

| | | | | |
|---|---|---|---|---|
| 4,436,682 A | * | 3/1984 | Knopp | 264/70 |
| 4,820,466 A | * | 4/1989 | Zachariades | 264/119 |
| 4,996,011 A | * | 2/1991 | Sano et al. | 264/28 |
| 5,002,714 A | * | 3/1991 | Sano et al. | 264/119 |
| 5,091,133 A | * | 2/1992 | Kobayashi et al. | 264/119 |
| 5,106,555 A | * | 4/1992 | Kobayashi et al. | 264/112 |
| 5,200,129 A | * | 4/1993 | Kobayashi et al. | 264/119 |
| 5,407,623 A | * | 4/1995 | Zachariades et al. | 264/119 |
| 5,578,373 A | * | 11/1996 | Kobayashi et al. | 428/364 |
| 6,951,685 B1 | * | 10/2005 | Weedon et al. | 428/364 |
| 7,348,053 B1 | * | 3/2008 | Weedon et al. | 428/297.7 |
| 7,740,779 B2 | * | 6/2010 | Harding et al. | 264/120 |
| 2008/0318016 A1 | * | 12/2008 | Weedon et al. | 428/219 |

* cited by examiner

*Primary Examiner*—Mary Lynn F Theisen

(57) ABSTRACT

A process for the production of virtually full density polyolefin suitable for further processing by drawing to form a high tenacity, highly oriented polyolefin sheet comprising: a) feeding a metered amount of polyolefin powder into the nip between two heated calender rolls; b) rolling the powder through the nip under these conditions until a coherent sheet of polyolefin is produced. According to a highly preferred embodiment, initially, the nip is set at a gap smaller than the size of the smallest polyolefin powder particle and at a temperature above the melting point of the powder and once a coherent sheet of polyolefin exits the nip the temperature in the nip is lowered to a temperature below the melting point of the polyolefin powder and the gap increased to a desired level above the thickness of the largest powder particle.

13 Claims, 4 Drawing Sheets

METHOD AND APPARATUS FOR THE PRODUCTION OF HIGH TENACITY POLYOLEFIN SHEET

This application is a continuation-in-part of U.S. patent application Ser. No. 12/080,197 filed Apr. 1, 2008 and copending herewith which is incorporated herein by reference in its entirety.

FIELD OF THE INVENTION

The present invention relates to ultra high molecular weight polyethylene (UHMWPE) and other high molecular weight polyolefin materials useful for ballistic applications and more particularly to a novel and highly economical process for their production.

BACKGROUND OF THE INVENTION

The processing of ultra high molecular weight polyethylene (UHMWPE), i.e. polyethylene having a molecular weight in excess of about 2 million, is known in the polymer arts to be extremely difficult. Products made from such materials are, however, very strong, tough and durable.

In the following series of U.S. Patents filed by Kobayashi et al and assigned to Nippon Oil Co., Ltd. a number of inventions related to the fabrication of fibers and films of polyolefins generally and UHMWPE specifically, are described: U.S. Pat. Nos. 4,996,011, 5,002,714, 5,091,133, 5,106,555, 5,200,129, and 5,578,373. The processes described in these patents generally describe the continuous production of high strength and high modulus polyolefin films by feeding polyolefin powder between a combination of endless belts disposed in an up and down opposing relationship, compression molding the polyolefin powder at a temperature below its melting point between the endless belts and then rolling and stretching the resultant compression molded polyolefin into an oriented film. As compression molded, the sheet is relatively friable thus requiring the subsequent calendering or drawing operations to provide an oriented film that exhibits very good strength and durability properties. In fact, the strength of such materials produced by these processes can be 3 times that of steel on a weight basis and they exhibit very low creep.

Enhanced processes for the production of such materials have also been described in the following U.S. patents and patent applications: U.S. Pat. No. 7,348,053 and U.S. patent application Ser. No. 11/217,279 filed Sep. 1, 2005.

A common element of all of these prior art processes is that they require compaction of an UHMWPE powder as the initial step in the production process. Until now, it has been the thinking of the UHMWPE manufacturing community that such powder compaction was necessary in order to place the material in a form that it could be subsequently rolled and drawn as described in the referenced prior art. Stated differently, it has been the thinking that in order to produce the product in a process involving the subsequent rolling and drawing steps to obtain the orientation required for the production of ballistically useful UHMWPE, the powder had to first be placed in the form of a sheet that demonstrated sufficient tenacity to be successfully processed in such subsequent rolling and drawing processes. In the prior art, such a form was obtained by compacting the powder into a relatively friable sheet that could be introduced into the rolling operation for subsequent processing.

The performance of this compaction process step, particularly in the production of UHMWPE sheets wider than 1-2 inches in width, requires the use of relatively massive, quite complex and very expensive equipment (measured in the millions of dollars for installed such equipment). Such equipment thus requires high levels of capital expenditures for installation and due to its complexity ongoing high operating and maintenance expenses. Additionally, compaction, as practiced in the prior art requires that the polymer be evenly distributed across and down-web (in the machine direction). Small variations in distribution (unequal mass) create defects in the sheet when it is subsequently calendered. Calendering requires that the mass entering the nip be substantially equal across the gap opening. If a streak or longitudinal area of the compacted sheet is low in polymer mass, it creates low density material in that area when it exits the calender. This results in a weak area in the film that can break during subsequent drawing, or leaves a weak place in the finished product. By introducing the polymer at the calender, the material can redistribute to a small degree and the resulting sheet has a much more consistent density. Even and consistent polymer distribution is one of the largest issues with any process that includes compaction.

U.S. Pat. No. 4,436,682 to Knopp, issued Mar. 13, 1984 describes a process for compacting polymer powders into fully dense products. According to this patent, a polymer powder is fed from a hopper into the nip between two rolls, compacted therein at a temperature below the melting point of the polymer powder and withdrawn from the nip under tension to form a "fully dense" polymer sheet. According to Knopp, when his process is applied to an UHMWPE powder, the resulting sheet has a density of about 0.82 g/cc which he designates as "substantially fully dense". It is well known that the density of UHMWPE is on the order of above 0.945 g/cc. Hence, the product of Knopp's process is hardly "fully dense" and is unsuited to further processing by calendering or drawing, since it will tear or break when subjected to such processes. Additionally, the temperature requirements recited by Knopp are such that subjecting, for example UHMWPE, to such temperatures during rolling to form the coherent sheet would destroy the properties of the UHMWPE making it unsuitable for subsequent calendering or for the application of the produced sheet to ballistic or other high impact applications.

It would thus be of great benefit to the producer of such UHMWPE materials, particularly in widths greater than a couple of inches, if a much simpler, smaller and less expensive first process step could be substituted for the powder compaction step, without negatively affecting the either the product thus produced or significantly affecting the kinetics of the process, i.e. it did not, for example, slow production to an uneconomical rate.

OBJECT OF THE INVENTION

It is therefore an object of the present invention to provide an enhanced process for the production of UHMWPE sheet that eliminates the need for the previously described compaction step and uses a much more cost effective and simpler process for the production of a high tenacity UHMWPE sheet that can undergo subsequent processing by drawing.

SUMMARY OF THE INVENTION

According to the present invention, there is provided a process for the production of virtually full density polyolefin suitable for further processing by drawing to form a high tenacity, highly oriented polyolefin sheet comprising: a) feeding a metered amount of polyolefin powder into the nip between two heated calender rolls; b) rolling the powder through the nip under these conditions until a coherent sheet of polyolefin is produced. According to a highly preferred embodiment, initially, the nip is set at a gap smaller than the size of the smallest polyolefin powder particle and at a temperature above the melting point of the powder and once a coherent sheet of polyolefin exits the nip the temperature in the nip is lowered to a temperature below the melting point of the polyolefin powder and the gap increased to a desired level above the thickness of the largest powder particle. Such a process not only eliminates the need for a separate and costly compaction step, but yields a coherent polyolefin sheet that is ready for drawing in accordance with prior art processes for the production of a high tenacity, highly oriented polyolefin sheet having a high heat of fusion. According to a further highly preferred embodiment of the present invention, the polyolefin of choice is ultra high molecular weight polyethylene (UHMWPE).

DETAILED DESCRIPTION

In the description that follows, operating parameters, material properties etc. are presented in the context of those for ultra high molecular weight polyethylene (UHMWPE), but it will be readily understood by the skilled artisan in the polymer field that the invention described herein is readily applicable to other polyolefin polymers such as high molecular weight polypropylene through the judicious selection of materials and process conditions appropriate for these other polyolefin materials.

Figure 1:
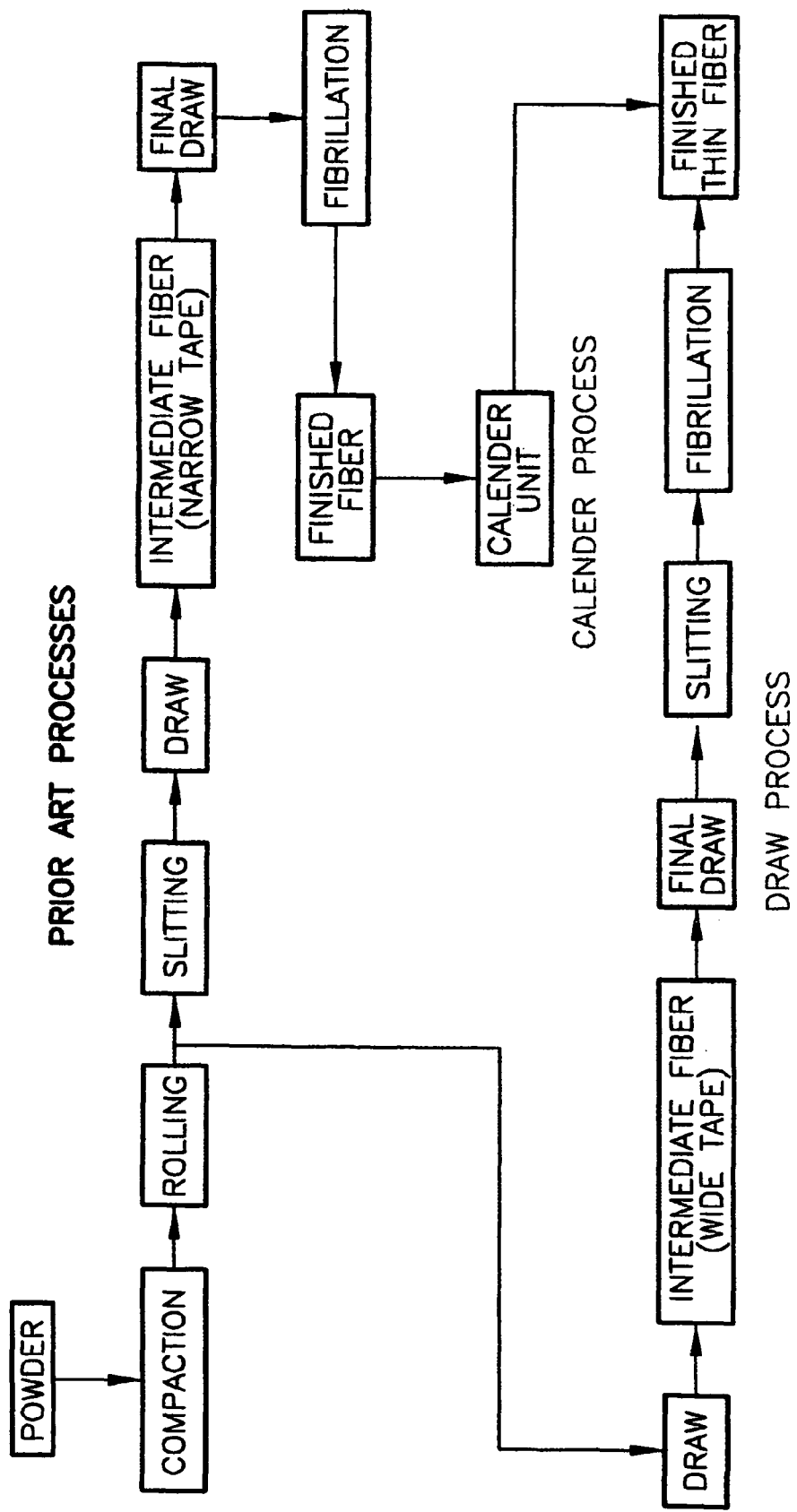
FIG. 1 is a schematic representation of the production processes of the prior art.

The term "tape" or "ribbon" as used herein refers to products having widths on the order of or greater than about ½ inch and preferably greater than 1 inch. The term "fiber" as used herein is meant to define a "narrow" tape, i.e. an element narrower than about ½ inch. The term "slit film fiber" refers specifically to a "fiber" or narrow tape made in accordance with the present invention that exhibits a generally rectangular cross-section and smooth, i.e. non-serrated or ragged edges. The terms "sheet" and "film" as used herein are meant to refer to thin sections of the materials of the present invention in widths up to and exceeding 160 inches in width as could be produced in large commercial equipment specifically designed for production in such widths. According to a preferred embodiment, such sheets, films, and tapes have a generally rectangular cross-section and smooth edges. Hence, the fundamental difference between a "tape", a "ribbon", a "slit film fiber", a "fiber", a "film" and a "sheet" as used to describe the products of the processes described herein relates to the width thereof and is generally independent of the thickness thereof. The term "fully dense" as used herein in connection with the production of a coherent UHMWPE sheet, as defined hereinafter, is meant to define a coherent UHMWPE sheet that exhibits a density above about 0.94 g/cc Referring now to FIG. 1, the processes described in the prior art and depicted schematically in FIG. 1 comprised the continuous production of high strength and high modulus polyolefin films by feeding polyolefin powder between a combination of endless belts disposed in an up and down opposing relationship, compacting the polyolefin powder at a temperature below its melting point between the endless belts and then rolling and stretching the resultant compression molded polyolefin into an oriented film. To the extent of their relevance to the modified processes described herein, the aforementioned prior art descriptions contained in U.S. Pat. Nos. 4,996,011, 5,002,714, 5,091,133, 5,106,555, 5,200,129, and 5,578,373 are incorporated herein by reference in their entirety.

A major difference between the processes of the prior art and those of the present invention is that the present invention obviates the need for the compaction step and its related high cost entirely while also improving the reliability of the process through the even distribution of polymer powder across and along the formed polymer sheet. Thus, one of the methods described herein begins with heated polyolefin powder introduced as described hereinafter directly into a pair of heated, counter rotating calender rolls under very specific temperature and gap conditions to produce a coherent polyolefin sheet suitable for subsequent further drawing to orient the polyolefin and to produce a ballistically or high impact condition useful high tenacity, highly oriented polymeric material.

According to one preferred embodiment of the present invention, the polyolefin processed in accordance with the process of the present invention is an UHMWPE that exhibits high crystallinity (above about 75% as determined by differential scanning calorimetry), a heat of fusion equal to or greater than 220 joules/gram and low levels of entanglement. Thus, it is preferred that the input starting material UHMWPE possess the degree of crystallinity and heat of fusion and meet the low entanglement requirements stated above. Such commercially available materials as Ticona X-168 from Ticona Engineering Polymers, 2600 Updike Road, Auburn Hills Mich. 48236 and type 1900 CM from Basell Corp. 2801 Centerville Road, Wilmington, Del. 19808 are useful in the successful practice of the present invention.

Figure 3:
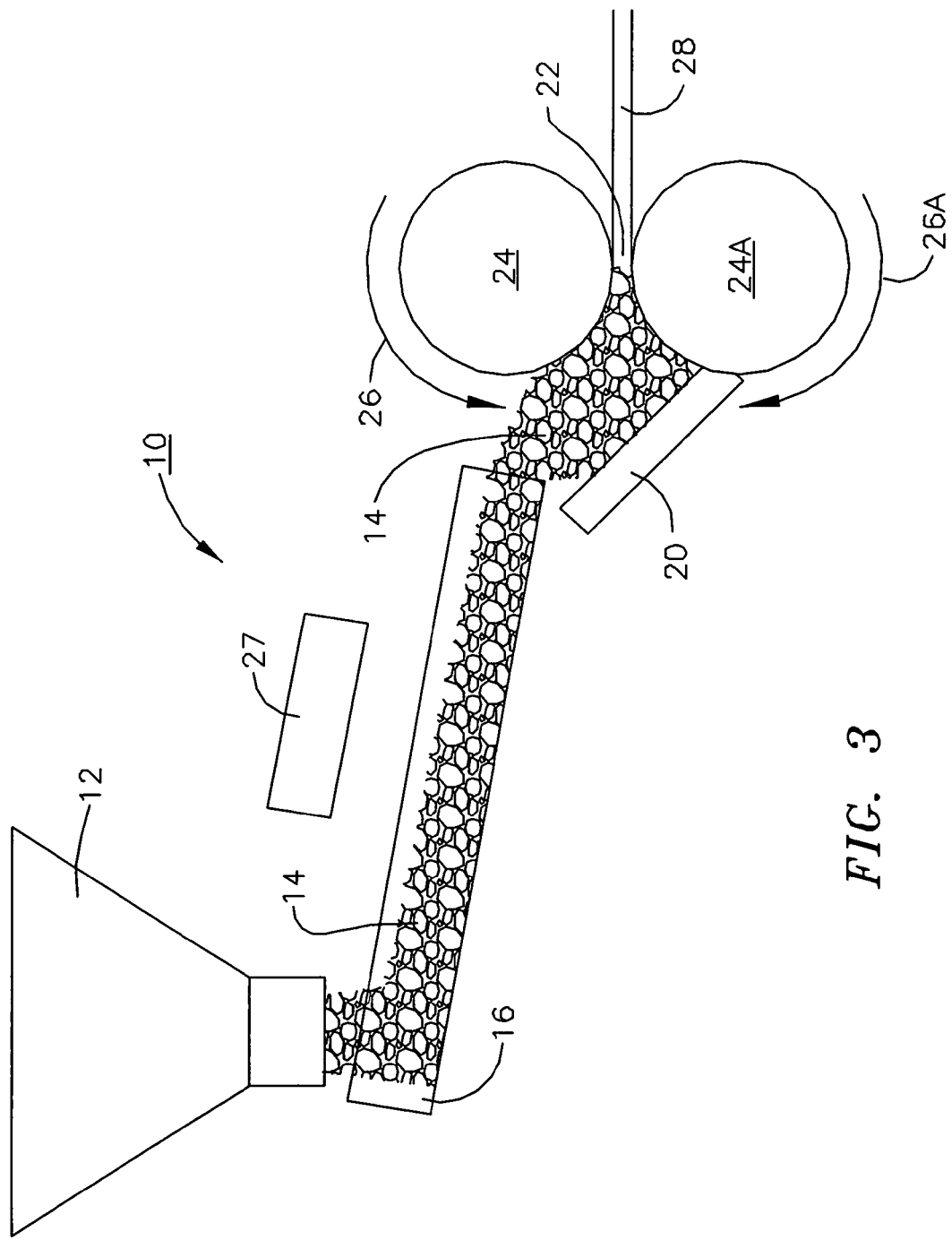
FIG. 3 is a schematic side view of the apparatus used to produce coherent UHMWPE sheet in accordance with the present invention.

Referring now to the accompanying drawings, as depicted in FIG. 3, the initial step in the process of the present invention utilizes a direct roll apparatus 10 comprising a polymer powder hopper 12 that feeds a metered amount of polymer powder 14 into a vibratory chute 16 via a metering device 18 and thence to a containment plate 20. At containment plate 20 the powder is introduced into the gap 22 between two counter rotating heated calender rolls 24 and 24A rotating in the directions shown by arrows 26 and 26A. A heater 27 preferably an infrared heater, imparts heat to powder 14 as described more fully below. Heater 27 is preferably located from about 2 to about 8 inches above powder 14 in vibratory chute 16 and set at a temperature of between about 160 and 220° F. These distances and temperatures will, of course, be variable depending upon the particular polymer powder 14 being processed, and the type of heater used, but have been found suitable for the processing of the preferred UHMWPE. As powder 14 cascades down vibratory chute 16 onto containment plate 20 it builds to a point where it is drawn into gap 22.

The successful practice of this embodiment of the present invention requires that at the start of the direct roll process, gap 22 be set narrower than the size of the smallest individual polymer powder particle, for example at about 50μ. Gap 22 may, of course, be widened if the minimum particle size of polymer powder 14 is greater than 50μ. Similarly, at start up of the direct rolling process described herein, heated calender rolls 24 and 24A are heated to a temperature above the melting point of polymer powder 14. While this melting point will be dependent upon the particular material being processed, in the case of the preferred UHMWPE starting materials described elsewhere herein this initial temperature can be as high as about 149° C. or about 3° C. above the melting point of the preferred UHMWPE. Lower temperatures could, of course, be appropriate for lower melting polyolefin materials. At this point, rolling of powder 14 is initiated. As soon as a coherent sheet of polymer 28 begins to emerge from gap 22 the temperature of calender rolls 24 and 24A is reduced to below the melting point of polymer powder 14 and gap 22 is increased to that desired for the final product thickness for coherent sheet 28. As used herein, the term "coherent sheet" is meant to define a polymer sheet that is suitable for further processing by drawing without tearing, ripping or otherwise becoming unusable in such additional processing. For all practical purposes, such a sheet will be virtually fully dense such as in the case of the preferred UHMWPE materials described herein having a density above about 0.945 g/cc. For the preferred UHMWPE powders 14 described elsewhere herein the operating temperature (the temperature after formation of a coherent sheet 28 is in the range of from about 136 to about 144° C. and preferably between about 139 and about 141° C., and the operating gap is on the order of 100μ and 230μ and preferably at about 140μ. It should be noted that the initial and operating temperatures recited herein are not necessarily set points for the polymer powder/sheet in nip 22, but rather surface temperatures of heated calender rolls 14 and 24A.

While the operating speed of the apparatus just described will vary with the particular polyolefin being processed, using the preferred UHMWPE materials described above, start up roll speeds of between about 1.9 to about 4.0 meters per minute have been found acceptable. Steady state operation of the apparatus is generally within the range of between about 2.0 and about 12.0 meters per minute. It should be noted that these operating speeds are based primarily on ones ability to take up coherent sheet 28 and the size of heated calendar rolls 24 and 24A, since larger rolls will generally tend to increase the surface in contact with the polymer in nip 22. Thus, if downstream operations or take up apparatus are capable of faster speeds, or larger diameter rolls are used, higher operating speeds for the direct roll process just described are possible.

The product of the just described process is a virtually full dense and translucent UHMWPE sheet, i.e. an UHMWPE sheet having a density of about 0.95 to about 0.98 g/cc.

While the apparatus used to practice the process of the present invention is depicted herein as horizontally oriented, the process will operate equally well in a vertical configuration, i.e. with the polymer powder being fed to gap 22 between two horizontally parallel calender rolls 24 and 24A. In this alternative orientation, powder 14 is metered from a heated hopper located above horizontally parallel calender rolls 24 and 24A so that powder 24 is fed from above into gap 22 and the product sheet 28 is drawn from below gap 22. All other operating procedures, i.e. temperature control and gap setting variations remain the same.

While not critical to the successful practice of the present invention, and clearly variable depending upon the particular polyolefin being processed, roll surface roughnesses of from about 4 to about 8 RMS have been found suitable for the processing of the preferred UHMWPE materials described herein.

Referring now to accompanying FIG. 4 that depicts a schematic side view of the alternative apparatus 70 useful in the successful practice of the alternative process of the present invention, rolls 24 and 24A according to this embodiment are oriented horizontally as opposed to vertically as previously described in connection with FIG. 2. As used in the description that follows, the following terms indicated by the reference numerals shown in FIG. 4 have the following meanings and purposes: doctor blade gap 74 controls the amount of polymer laid on rolls 24 and 24A and finally introduced into the nip 76. For the horizontal roll arrangement shown in FIG. 4, the mass (amount) of polymer laid on the rolls must equal the mass (amount) that exits nip 76 as a sheet; (if the mass is higher, it will build up above nip 76 and eventually spill over the side as waste or create such a high nip pressure the rolls gap will be forced open and/or the roll torque required to turn the rolls will break a mechanical component or stall the drive motor); roll nip or roll gap 76 is the closest distance between opposing rolls 24 and 24A (this is the main parameter that controls rolled sheet thickness); roll nip reservoir 78 is the small reservoir of polymer that sits just above roll nip 76 (in a horizontal arrangement, the polymer touches both rolls and is brought into the nip by friction and compression from both rolls, while in the vertical arrangement previously described, the material is slightly self regulating since it can rest mainly on roll 24A and fall back out of nip 28 if too much powder is present).

Figure 4:
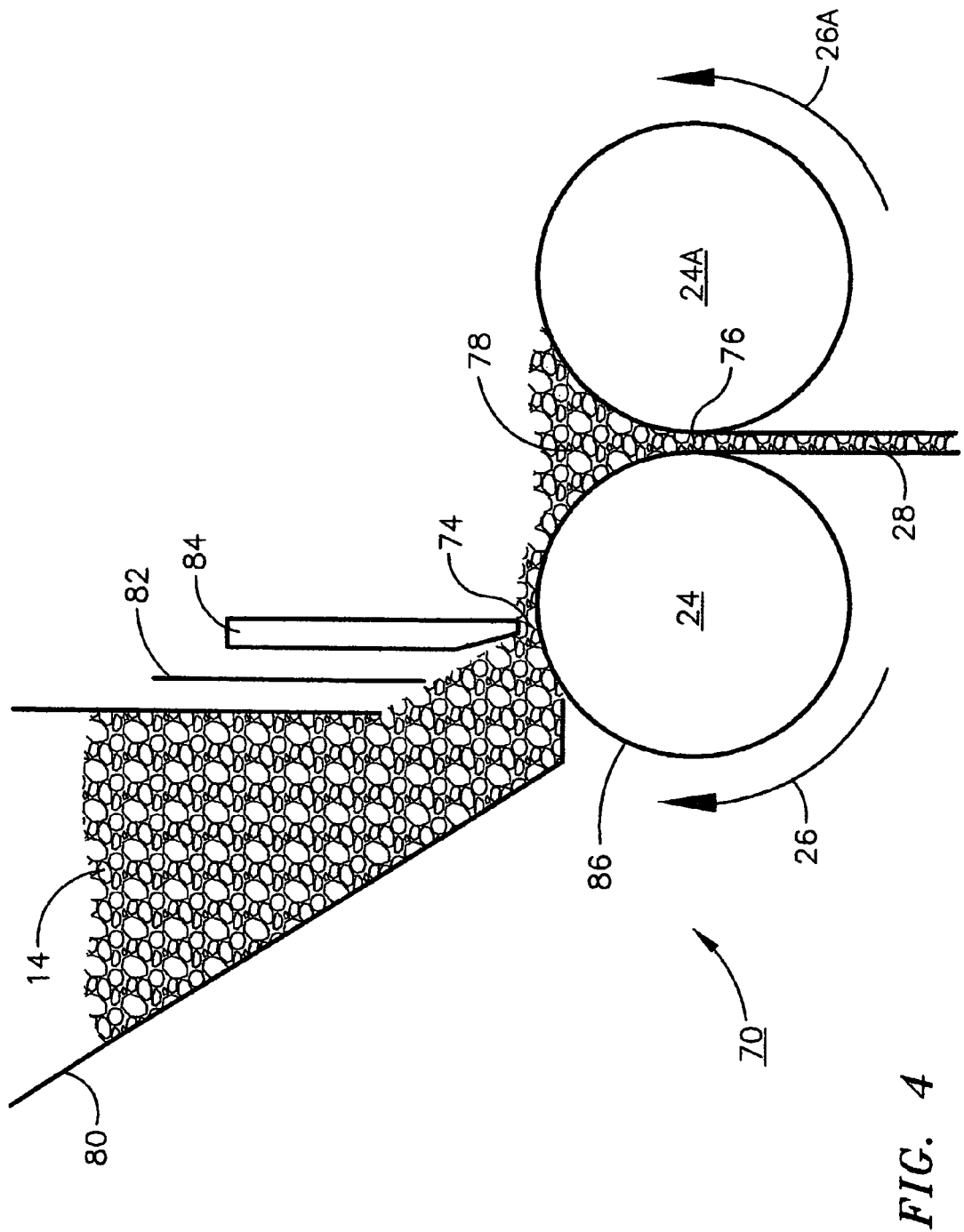
FIG. 4 is a schematic side view of an alternative apparatus used to produce coherent UHMWPE sheet in accordance with an alternative embodiment of the present invention.

In accordance with the embodiment depicted in FIG. 4, polymer 14 is supplied from a hopper 80 that includes a hopper gate 82 that helps to control the flow of polymer 14 from hopper 80. Since, as described below, heating of polymer 14 takes place as polymer 14 contacts and is rotated on periphery 86 of roll 24, it is preferred that hopper 80 not be heated, although some small amount of heat can be imparted to polymer 14 while it is resident in hopper 80 and such imparting of minimal amounts of heat, i.e. at temperatures significantly below the melting point of polymer 14 (for example below the 160° F. to 220° F. preheat temperatures used in the previously described "vertical" process) should be considered as within the meaning of the term "unheated" as used to describe hopper 80 in the appended claims. A doctor blade 84 regulates the flow of polymer 14 from hopper 80 onto roll 24 wherefrom it is transported about the periphery 86 of roll 24 into roll nip reservoir 78. It is preferred, but not absolutely necessary, that doctor blade 84 be vibrated. The setting of doctor blade 84 is determined by sensors (not shown) that detect the amount of powder in the roll nip reservoir 78, the presence and amount of powder, if any, at the horizontal extremes of roll nip reservoir 78 and the force between the rolls. The design, fabrication and operation of such devices are well within the skills of the skilled artisan and, accordingly, are not described in detail herein. Coherent sheet, tape, ribbon, film or fiber 28 emerges from roll nip 76 as in the case of the "vertical" process described above.

In order to better understand the operation of the apparatus just described, it is important to understand the role and the operation of doctor blade 84. The doctor blade gap 74 controls the amount of polymer 14 delivered to the roll nip 76. Roll nip gap 76 controls the amount of polymer 14 removed from roll nip reservoir 78. Roll nip reservoir 78 acts not only as a filter to maintain this balance, but also serves as a means of forcing material into roll nip gap 76. If polymer 14 is delivered from doctor blade gap 74 at a higher rate than it is removed, roll nip reservoir 78 will overflow or become so large that the pressure in roll nip 76 will open roll nip 76, break a mechanical component, or stall the motor. If polymer 14 exits roll nip reservoir 78 faster than it is fed in, the rolled sheet will have insufficient polymer and have voids.

Doctor blade gap 74 and the roll speed control the quantity of polymer 14 delivered to nip 76. The laydown on roll 24A does not need to be as uniform as required by the prior art double belt process of Kobayshi due to the presence of roll nip reservoir 78. Thus, roll nip reservoir 78 serves as a small quantity reservoir (peaks and valleys in the laydown are accumulated and redistributed) and it also allows polymer 14 to move sideways to a small extent.

Similarly, it is important to fully understand the function of roll nip reservoir 78. For a given roll gap 76, the product thickness will remain within a fairly narrow range. The height of roll nip reservoir 78 above roll nip 76 determines how much of polymer 14 is in contact with rolls 24 and 24A and the diameter of rolls 24 and 24A polymer 14 is in contact with rolls 24 and 24A and the diameter of rolls 24 and 24A also play a function. As rolls 24 and 24A rotate, polymer 14 is brought closer to roll nip 76 and the density of polymer 14 is increased as it approaches roll nip 76 until at some point it reaches the maximum density for polymer 14. If the volume of polymer 14 in roll nip reservoir 78 is higher, polymer 14 reaches its maximum density earlier in the rotation of the rolls as shown by arrows 26 and 26A. If the amount of polymer 14 in roll nip reservoir 78 is too small, polymer 14 is brought into roll nip 76 and compressed into a compacted sheet but as it approaches roll nip 76, the sheet never reaches full density before it is finally rolled into a sheet at or near the closest point between the rolls, in the center of roll nip 76. In other words, at a given doctor blade gap, a certain amount of polymer 14 is laid on roll 24. The roll speed determines how fast this material is rotated around and fed into the roll nip (gap) 76. However, at this point, it becomes a balancing issue. It is desired that an exit rolled sheet have a given thickness and strength. If polymer 14 is delivered into roll gap 76 in an insufficient amount, and roll gap 76 is held constant, roll nip reservoir 78 will partially empty and the sheet density will fall. The lower density will initially show up as a loss in strength, followed by voids of sufficient size to make the product more opaque. Since insufficient pressure will be exerted on the polymer particles they will not bind together as well and as this binding strength and compression falls, the polymer 14 strength will fall along with increasing voids.

While not absolutely necessary to the successful practice of the present invention, it is desirable to use side or end dams (not shown in the accompanying drawing) to limit lateral movement of polymer 14 against doctor blade 84.

While the size (diameter), finish and speed of rolls 24 and 24A can vary broadly, certain parameters for these elements have been found to be particularly useful in the successful practice of this embodiment of the present invention. Rolls of 9 and 12 inches in diameter have been found particularly useful, but rolls of larger and smaller diameters can be used providing certain minimum pressures are maintained in roll gap 76. With larger rolls increased speeds are possible due to the longer contact time between the roll and polymer 14 as it rotates in contact with periphery 86. For rolls about 12 inches in diameter, speeds of from about 1 up to about 12 m/min are possible while rotations speeds of between about 1 and to about 3 m/min have been found satisfactory with roll rotation speeds of about 2.3 meters per minute producing highly desirable results with the particular UHMWPE materials being processed. Speed conditions for other roll diameters processing similar UHMWPR polymers are generally as follows: for a 15" diameter roll (1.2 meters circumference), speeds of about 2.88 m/min are highly desirable; and for a 24" roll the optimum speed approaches 4.6 m/min.

Roll surfaces must be hard and possess good wear and abrasion characteristics. The surfaces should be consistently smooth to provide consistent movement of the polymer into roll nip 76. Chrome surfaces in the 1-15 RMS range are preferred. Markings and discoloration of the surfaces have an impact on process performance. If the roll surface shows discoloration, more or less heat transfer occurs. This can leave a minor mark on the product and at worse a weak spot.

Again, while roll gap 76 can vary widely depending upon the polymer being processed, the diameter of rolls 24 and 24A, etc. for the production of UHMWPE sheet in a thickness range of from about 0.05 and about 0.25 mm in accordance with this embodiment, roll gaps of between about 0.015 and about 0.35 mm have proven satisfactory with rolls of a size as specified herein. These ranges should be considered merely as guidelines as wider or narrower roll gaps my be necessary or desired depending upon the various parameters, especially roll diameter, described hereinabove.

As with the previously described vertical roll process, certain start-up parameters are desirable, but, depending upon the polymer material being processed, not absolutely necessary. According to one preferred embodiment, it is preferred that at start up the rolls be heated to a temperature of from about 1 to about 5 degrees above the melting point of the polymer being processed and the roll gap be set at from about 20 to about 50 microns smaller than the operating roll gaps suggested above. Under operating conditions, for the processing of UHMWPE, the roll temperatures should be in the range of from about 130° C. and about 150° C., preferably in the range of from about 132° C. and about 143° C., and most preferably between about 136° C. and about 140° C. While these start up conditions are preferred for certain of the UHMWPE materials discussed herein, they are not critical and in many instances the gap and temperature requirements at start up are similar to those used during operation. For example, in certain cases, operating temperatures of between about 130° C. and 146° C. will be satisfactory with narrower temperature ranges of from about 136.5° C. to about 142° C. desirable at roll speeds of between about 1 and about 4 meters per minute. Roll gaps at start up will generally be about the same as those used under operating conditions, i.e. between about 0.015 and about 0.35 mm using the materials and conditions described herein. Applicants do not, however, wish to be bound to specific narrow start up and operating conditions as these will vary widely depending upon the material being processed, the desired product sheet thickness, the roll temperature, the roll speed, the roll size, the roll finish, etc.

As will be apparent to those skilled in the art, it would be an obvious alteration of the instantly described "horizontal" process to use a pair of mirror imaged hopper 80, and doctor blade 84 arrangements to obtain a coherent sheet 28. Such an alteration of apparatus 70 can result in higher operating speeds.

One very significant advantage of the just described alternative process is that it broadens somewhat the range of useful starting materials/polymers. Using this "horizontal" process just described, UHMWPE polymers having molecular weights as low as 1 million and exhibiting heats of fusion as low as about 190 joules per gram and concomitantly lower degrees of crystallization have been successfully processed into ballistic and high impact resistant sheets, ribbons, tapes, films and fibers that exhibit properties similar to those of material produced in accordance with the "vertical" roll process described above and the modified Kobayashi process described in U.S. Pat. No. 7,348,053.

Post-processing of coherent sheet 28 to obtain a highly useful UHMWPE ballistic or impact resistant sheet, film, tape, ribbon or fiber is performed in much the same fashion as and in apparatus similar to that described in issued U.S. Pat. No. 7,348,053, issued Mar. 25, 2008, i.e. by drawing coherent sheet 28 which are referred to and incorporated herein in their entirety.

Figure 2:
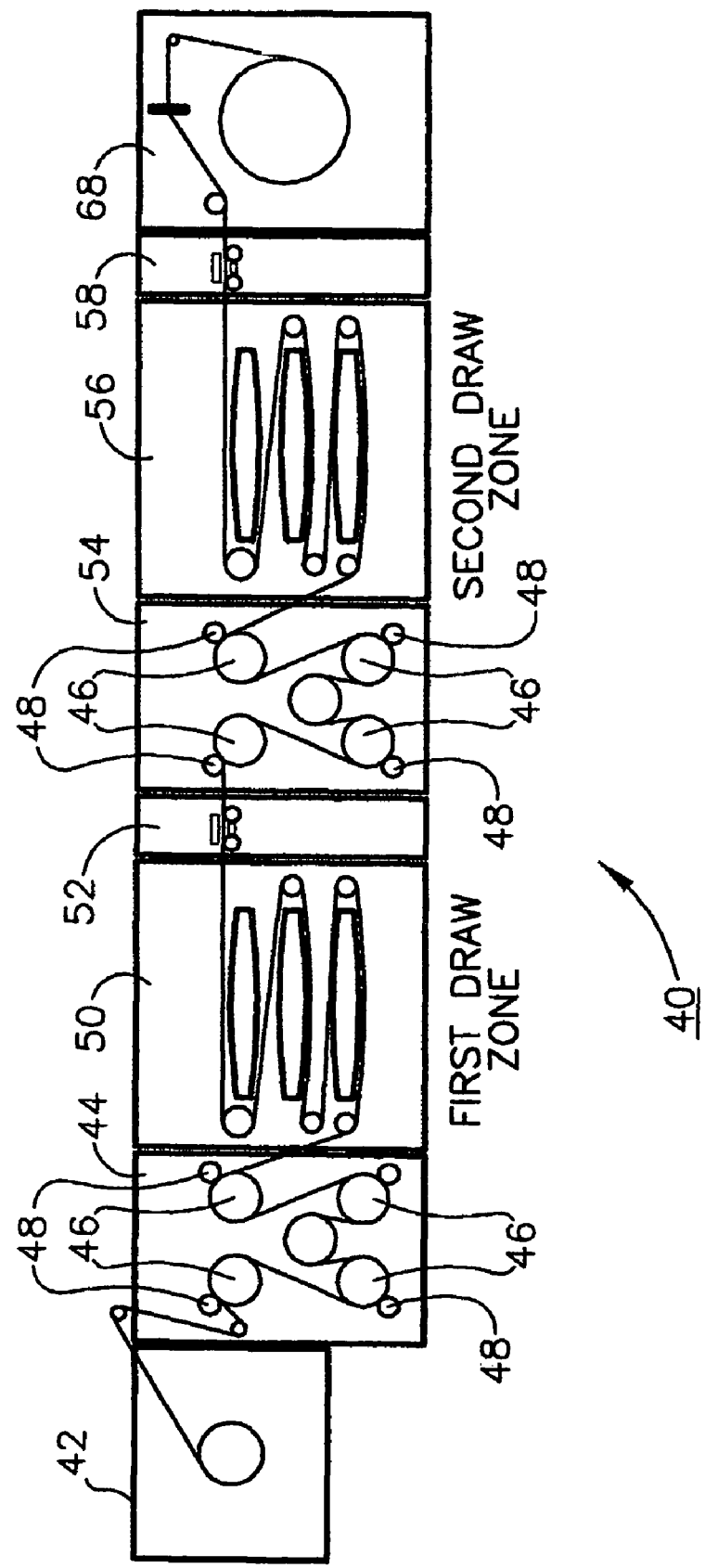
FIG. 2 is a schematic diagram of a preferred embodiment of the apparatus used to implement the drawing portion of the preferred process of the present invention.

Referring now to FIG. 2, the drawing apparatus utilized to achieve the thickness reduction and strength increase of the coherent sheet produced as just described that result in production of the preferred UHMWPE products of the present invention 10 comprises:

a payoff 42, a godet stand 44 including heated godet rolls 16 (to anneal the product) and nip rolls 48 for establishing and maintaining tension in the line, a first draw zone 50, a first in-line tension sensor 52, a second godet stand 54, a second draw stand 56, a second in-line tension sensor 58, a third godet stand 60 and according to the preferred embodiment, a fibrillation unit 62, a nip roll stand 64 for maintaining tension and godet station 66 comprised of unheated take-up rolls 68. As seen from FIG. 1, the input or starting material of this process is generally the thick, compacted and rolled but unoriented product of the compaction step of the prior art production process. According to the preferred process of the present invention, the input or starting material in the drawing/calendaring process steps described below is, of course, coherent sheet 28 that emerges from gap 22 in the process described above.

Each of the elements of the apparatus just described and utilized in the successful practice of the present invention are well known in the film and fiber drawing arts as is their combination in a line of the type just described. Consequently, no detailed description of such a line is required or will be made herein and the reader is referred to the numerous design manuals and descriptions of such apparatus commonly available in the art.

Maintaining a constant tension of between about 0.5 and about 5 g/denier, and preferably between about 0.8 and 3 g/denier during drawing is also important to the production of product having the required "thinness" and other enhanced properties specified herein. The term "denier" as used herein is defined as the weight in grams of 9000 meters of the product film, tape, sheet or fiber. At tension levels below 0.5 g/denier reductions will be obtained, but the enhanced properties discussed above may not be fully achieved, while at tension levels above about 5 g/denier the material will tend to separate. In the case of drawing, tension is a function of the feed polymer and can vary broadly depending thereon and the ranges just specified refer to those found useful with particular preferred UHMWPE commercial starting materials. The UHMWPE is preferably drawn at a constant and controlled tension and at a temperature of between 140 and 158° C.

According to a highly preferred embodiment of the present invention, drawing is performed in line with direct rolling as described hereinabove. In such a continuous process, calender rolls 24 and 24A become payoff 72 of drawing apparatus 70. Such an arrangement provides a highly efficient method for practicing the novel production process of the present invention.

After thickness reduction by drawing in the apparatus shown in FIG. 2 according to the processing parameters just described, the UHMWPE films, sheets, fibers or tapes thus produced exhibit heats of fusion at or above about 243 joules/gram, tenacities in the range of from about 18 and 20 g/d, tensile moduli between about 1200 and about 1800 g/d and elongations in the range of from about 1.6 to about 2.0 percent.

There have thus been described novel processes for the production of coherent polyolefin, preferably UHMWPE, sheet and high tenacity, highly oriented polyolefin, preferably UHMWPE, sheet, film, tape, ribbon or fiber that eliminates the need for the prior art compaction step which, until the development described herein, was considered necessary for the successful production of such materials. the need for the prior art compaction step which, until the development described herein, was considered necessary for the successful production of such materials.

As the invention has been described, it will be apparent to those skilled in the art that the same may be varied in many ways without departing from the spirit and scope of the invention. Any and all such modifications are intended to be included within the scope of the appended claims.

What is claimed is:

1. A process for the production of high tenacity, highly oriented polyolefin sheet having a high heat of fusion comprising:
   a) providing a pair of horizontally aligned counter rotating calender rolls separated by a nip, a doctor blade in alignment with a first of said calender rolls, and a gap between said doctor blade and said first calender roll;
   b) feeding a metered amount of polyolefin powder into said nip between said counter rotating heated calender rolls;
   c) controlling the amount of polyolefin powder at said nip by adjusting said gap between said doctor blade and said first calender roll;
   d) rolling the powder through the nip until a coherent fully dense sheet of polyolefin is produced: and
   e) drawing the coherent fully dense sheet of polyolefin under controlled tension at a temperature of between 140° C. and 158° C. to produce a high tenacity, highly oriented polyolefin sheet having a high heat of fusion.

2. The process of claim 1 wherein the polyolefin powder comprises an ultra high molecular weight polyethylene powder.

3. The process of claim 2 wherein the ultra high molecular weight polyethylene powder exhibits high crystallinity, a molecular weight above 1 million, a heat of fusion equal to or greater than 190 joules/gram and low levels of entanglement.

4. The process of claim 3 wherein the fully dense coherent sheet has a density above 0.945 g/cc.

5. The process of claim 4 wherein
said nip includes an operating gap;
said operating gap is between 0.015 mm and 0.35 mm; and
said counter rotating calender rolls include surface temperatures between 136.5° C. and 142° C.

6. The process of claim 5 wherein the counter rotating calender rolls rotate at a rate of between 1 and 12 meters/minute.

7. The process of claim 6 wherein drawing is performed in-line and continuously with the formation of the coherent fully dense sheet.

8. A process for the production of a coherent virtually fully dense polyolefin sheet suitable for further processing by drawing to produce a high tenacity, highly oriented film, tape, fiber, ribbon or sheet from a polyolefin powder comprising:
   a) providing a pair of horizontally aligned counter rotating calender rolls separated by a nip, a doctor blade in alignment with a first of said calender rolls, and a gap between said doctor blade and said first calender roll;
   b) feeding a metered amount of polyolefin powder into said nip between said counter rotating heated calender rolls;
   c) controlling the amount of polyolefin powder at said nip by adjusting said gap between said doctor blade and said first calender roll; and d) rolling the powder through the nip under these conditions until a coherent fully dense polyolefin sheet is produced.

9. The process of claim 8 wherein the polyolefin powder comprises an ultra high molecular weight polyethylene powder.

10. The process of claim 9 wherein the ultra high molecular weight polyethylene exhibits high crystallinity, a molecular weight above 1 million, a heat of fusion equal to or greater than 190 joules/gram and low levels of entanglement.

11. The process of claim 10 wherein the coherent fully dense sheet has a density above 0.945 g/cc.

12. The process of claim 11 wherein the operating gap is between about 0.015 mm and 0.35 mm and the operating temperature is between 136.5° C. and 142° C.

13. The process of claim 12 wherein the counter rotating heated calender rolls are aligned horizontally and rotate at a rate of between 1 and 12 meters/minute.

* * * * *